(12) United States Patent
Zhang

(10) Patent No.: US 9,687,790 B2
(45) Date of Patent: Jun. 27, 2017

(54) VERTICAL PRESSURIZED IMMERSION MEMBRANE FILTRATION SYSTEM

(76) Inventor: Huichun Zhang, Beijing (CN)

( * ) Notice: Subject to any disclaimer, the term of this patent is extended or adjusted under 35 U.S.C. 154(b) by 232 days.

(21) Appl. No.: 14/346,556

(22) PCT Filed: Sep. 29, 2011

(86) PCT No.: PCT/CN2011/001653
§ 371 (c)(1),
(2), (4) Date: Mar. 21, 2014

(87) PCT Pub. No.: WO2013/040728
PCT Pub. Date: Mar. 28, 2013

(65) Prior Publication Data
US 2015/0048019 A1  Feb. 19, 2015

(30) Foreign Application Priority Data

Sep. 22, 2011  (CN) .......................... 2011 1 0284499

(51) Int. Cl.
*B01D 61/18*  (2006.01)
*C02F 1/44*  (2006.01)
*B01D 63/04*  (2006.01)

(52) U.S. Cl.
CPC ............ *B01D 63/04* (2013.01); *B01D 61/18* (2013.01); *B01D 63/043* (2013.01); *C02F 1/44* (2013.01);
(Continued)

(58) Field of Classification Search
CPC ............ B01D 2313/04; B01D 2313/06; B01D 2313/13; B01D 2313/20; B01D 2313/21;
(Continued)

(56) References Cited

U.S. PATENT DOCUMENTS 7,404,843 B2 * 7/2008 Kaschemekat ........ B01D 53/22
210/321.78
2005/0121391 A1  6/2005 Koch

FOREIGN PATENT DOCUMENTS

CN  1488430 A * 4/2004
CN  2611021 Y    4/2004
(Continued)

OTHER PUBLICATIONS

English translation CN 1488430 A (2004).*
English translation EP 1302228 A1 (2003).*
English translation DE 3839984 A1 (1990).*

*Primary Examiner* — John Kim
(74) *Attorney, Agent, or Firm* — Muncy, Geissler, Olds & Lowe, P.C.

(57) ABSTRACT

A vertical pressurized immersion membrane filtration system includes at least one pressure vessel/tank and at least one layer of membrane modules sealed therein. Every layer has at least two parallel membrane modules, with space left between the membrane module and the pressure vessel/tank. The upper and lower ends of every membrane module have plates and the upper and lower membrane modules are hermetically connected. The plates separate the space in the pressure vessel/tank into two sealed end compartments and a middle compartment. The membrane module includes interior membrane fibers and an outer perforated supporting cylinder surrounding the membrane fibers. The pressure vessel/tank has end and middle water inlets/outlets. The pressure vessel/tanks are parallel. The multiple membrane modules work simultaneously, effectively increasing filtration efficiency. The filtration system can work in multiple operation modes, improving applicability thereof.

12 Claims, 5 Drawing Sheets

(52) U.S. Cl.
CPC ...... *B01D 2313/04* (2013.01); *B01D 2313/06* (2013.01); *B01D 2313/13* (2013.01); *B01D 2313/20* (2013.01); *B01D 2313/21* (2013.01); *B01D 2315/06* (2013.01); *B01D 2319/02* (2013.01); *B01D 2319/04* (2013.01); *C02F 2301/066* (2013.01); *C02F 2303/14* (2013.01)

(58) Field of Classification Search
CPC ............ B01D 2315/06; B01D 2319/02; B01D 2319/04; B01D 61/18; B01D 63/04; B01D 63/043; C02F 1/44; C02F 2301/066; C02F 2303/14
See application file for complete search history.

(56) References Cited

FOREIGN PATENT DOCUMENTS

| | | | |
|---|---|---|---|
| CN | 201263972 Y | | 7/2009 |
| CN | 201283273 Y | | 8/2009 |
| CN | 201295595 Y | | 8/2009 |
| CN | 102160966 A | | 8/2011 |
| DE | 3839984 A1 | * | 2/1990 |
| EP | 1302228 A1 | * | 4/2003 |

* cited by examiner

VERTICAL PRESSURIZED IMMERSION MEMBRANE FILTRATION SYSTEM

TECHNICAL FIELD OF THE INVENTION

The present invention relates to a membrane filtration system, specifically relates to a vertical pressurized immersion membrane filtration system.

BACKGROUND OF THE INVENTION

Nowadays, the convectional vertical pressurized membrane filtration systems are generally composed of a hollow fiber membrane modules provided in a vessel/tank, feed-water inlet pipes (manifolds and branch pipes), permeate outlet pipes (manifolds and branch pipes), concentrate pipes (manifolds and branch pipes) and a membrane rack. The membrane modules are connected in parallel on the two sides of the manifolds. Because of the limited filtration capacity of a single membrane module, the large system needs to use many membrane modules, which leads to system complexity, high cost and risk of fault. Furthermore the convectional pressurized membrane filtration system is not compatible with an immersion membrane filtration system.

CONTENT OF THE INVENTION

The purpose of the present invention is to solve the deficiency/problems of existing conventional technology. The present invention provides a vertical pressurized immersion membrane filtration system with simple structure and low cost, which can be provided with one layer or two layers of membrane modules and multiple membrane modules working simultaneously in one pressure vessel/tank, and that effectively increases filtration efficiency of the filtration system. The present invention can work in multiple operation modes, which extremely improves the applicability.

The present invention provides a vertical pressurized immersion membrane filtration system, which includes a vertically-set pressure vessel/tank with its ends sealed, and at least one layer of membrane module sealed in said pressure vessel/tank, every layer is provided with at least two membrane modules, and the membrane modules in every layer are in parallel to each other; there is a clearance between the said membrane module and said pressure vessel/tank. End plates are provided on the uppermost end and the lowest end of the membrane modules, and the said two end plates separate the space in the pressure vessel/tank into two end compartments which is respectively sealed and a middle compartment in between the end plates vessel/tank. The said membrane modules include membrane fiber and an outer perforated supporting cylinder, the water passes in or out of said perforated supporting cylinder. The said pressure vessel/tank is provided with an end water inlets/outlets respectively at the outsides of both of the two end compartments, the said vessel/tank is provided with a middle water inlets/outlets at the outside of said middle compartment. The multiple pressure vessel/tanks are provided in parallel to each other for large filtration system.

The vertical pressurized immersion membrane filtration system of the present invention also can be:

Two layers of membrane modules are sealed in said pressure vessel/tank, and the adjacent membrane modules between two layers are hermetically connected by connectors.

The upper and lower ends of the pressure vessel/tank are provided with a detachable upper and lower cover respectively for sealing said pressure vessel/tank.

Said membrane module includes potting located at the two ends of the membrane fibers, and ending heads located at the outside of said potting. Said ending heads fix said potting, said membrane fibers and said outer perforated supporting cylinder together.

Said end plates are provided with fixing holes with their shape being match up with the shape of said ending heads. The edge of the upper ending heads located at the upper end of said membrane module are hermetically fixed in the fixing holes of the upper end plate. The edge of the lower ending heads located at the lower end of said membrane module are hermetically fixed in the fixing holes of the lower end plate.

The size of the fixing holes on the upper end plate is bigger than the size of the fixing holes on the lower end plate. The fixing hole of the upper end plate is fixed with the outer wall of the upper ending head on the upper end of said membrane module. The fixing hole of the lower end plate is fixed with the inner wall of the lower ending head on the lower end of said membrane modules.

The shape of said ending head, potting, outer perforated supporting cylinder and said fixing holes are coincident.

Said outer perforated supporting cylinder can be of net-shaped sheet or cylinder with water-flow-through holes.

Said pressure vessel/tank is made of metallic material, or concrete material.

Said pressure vessel/tank is built on the ground or the lower half part of said pressure vessel/tank is located under the ground.

Said two end water inlet/outlets are located at the same side of said pressure vessel/tank.

Said two end water inlet/outlets and said middle inlet/outlet are located at the same side of said pressure vessel/tank.

Said middle water inlet/outlet is located at the highest point of said middle compartment.

The vertical pressurized immersion membrane filtration system in the present invention, includes a vertically-set pressure vessel/tank with its end sealed, and at least one layer of membrane modules, which is provided and sealed in said pressure vessel/tank. Every layer of membrane modules provided with at least two membrane modules, and the membrane modules in each layer of membrane module are in parallel to each other. There is clearance between said membrane modules in said pressure vessel/tank. The end plates are provided on the uppermost end and the lowest end of said membrane modules, and said two end plates separate the space in the pressure vessel/tank into two sealed end compartments which is respectively sealed and a middle compartment between the two end compartments. The two end compartments are located respectively at the upper end and lower end of the pressure vessel/tank, the said membrane modules include membrane fiber and an outer perforated supporting cylinder, the water passes in or out of said perforated supporting cylinder, said pressure vessel/tank is provided with end inlets/outlets respectively at the outside of both two end compartments, said pressure vessel/tank is also provided with a middle inlet/outlet at the outside of the middle compartment, the pressure vessel/tanks are provided in parallel to each other. Compared with current technology, the vertical pressurized immersion membrane filtration system of present invention has advantages such as: the membrane fibers are surrounded by a permeable outer perforated supporting cylinder. The feed-water can either enter into the membrane lumens from two ends of the membrane modules and then discharged from the circumference of the membrane module, or the feed—water can be distributed in the membrane bundles and be filtrated through from outer of the membrane fibers and the permeate come out from two ends of the membrane modules, namely both inside-out membrane and outside-in membrane can be used for the same pressure vessel/tank, which extends the applicability of the membrane filtration system. Moreover, since one or two layers of membrane modules can be loaded and each layer of the membrane module is composed of at least two membrane modules, multiple membrane modules can be provided in one pressure vessel/tank, and the multiple membrane modules work on filtrating water simultaneously, which improves extremely the filtration efficiency of the filtration system. Furthermore, every membrane module is sealed on the end plates, it is not necessary to replace all of the membrane modules in the maintenance procedure, and only the one with deficiency needs to be replaced or repaired, which is convenient for maintenance and thus prolongs the lifecycle of the whole membrane filtration system. At the same time, the simple structure of the membrane modules and the end plates enables easy fabrication and reduces largely the manufacturing cost of the overall vertical pressurized immersion membrane filtration system. Further more, multiple pressure vessel/tanks can be installed for filtration together, which further improves the filtration efficiency.

SUMMARY DESCRIPTION OF THE FIGURES

ILLUSTRATION OF THE REFERENCE NUMBERS IN FIGURES

Figure 1:
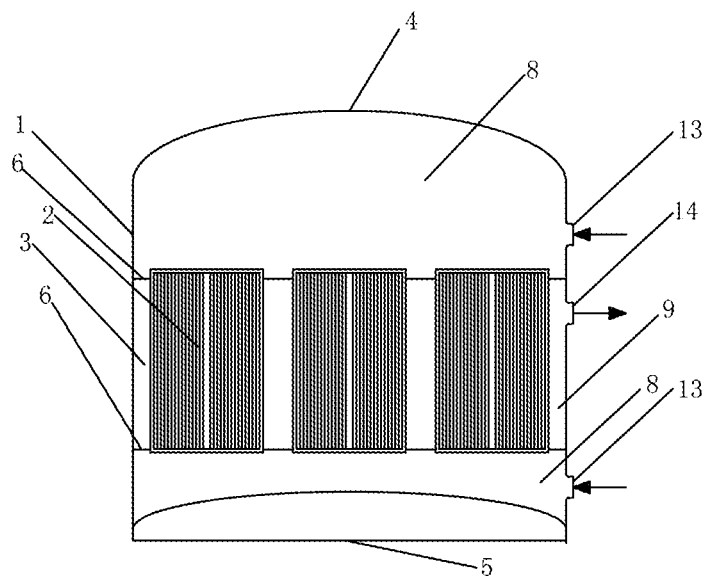
FIG. 1 is a schematic view of embodiment 1 of the vertical pressurized immersion membrane filtration system according to the present invention.

1 . . . pressure vessel/tank; 2 . . . membrane module; 3 . . . clearance; 4 . . . upper cover; 5 . . . lower cover; 6 . . . end plate; 7 . . . connector; 8 . . . end compartment; 9 . . . middle compartment; 10 . . . membrane fiber; 11 . . . outer perforated supporting cylinder; 12 . . . fixing hole; 13 . . . end water inlet/outlet; 14 . . . middle water inlet/outlet; 15 . . . potting; 16 . . . ending head

DETAILED DESCRIPTION OF THE INVENTION

The detailed embodiments according to the present invention will be described with reference to the drawings.

The First Embodiment

Figure 4:
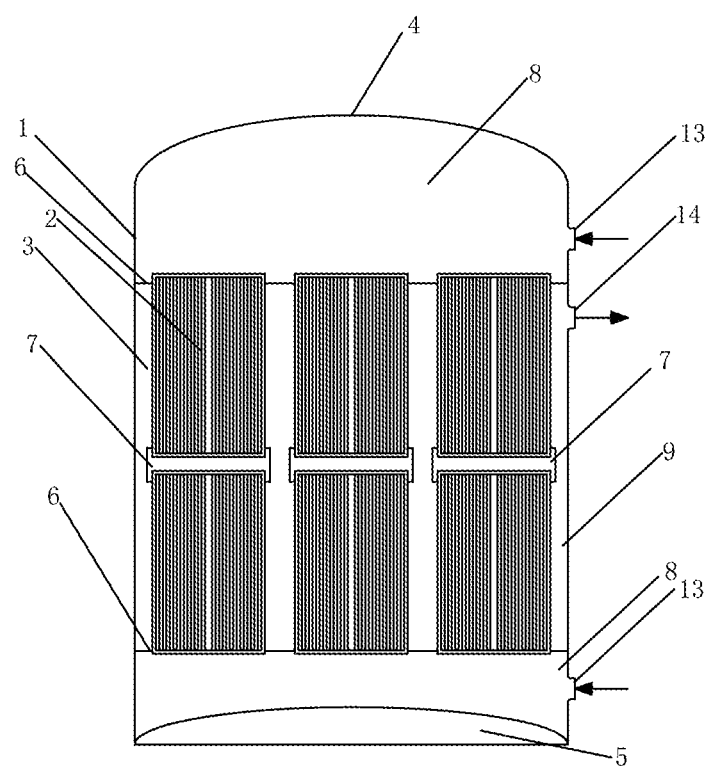
FIG. 4 is a schematic view of this vertical pressurized immersion membrane filtration system with two layer of membrane module according to the present invention.
Figure 5:
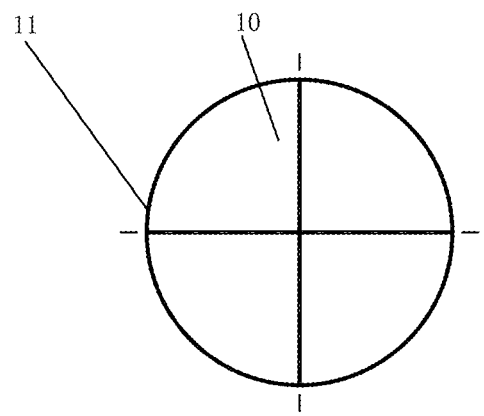
FIG. 5 is a sectional view of the membrane module of this vertical pressurized immersion membrane filtration system according to the present invention.
Figures 6, 7:
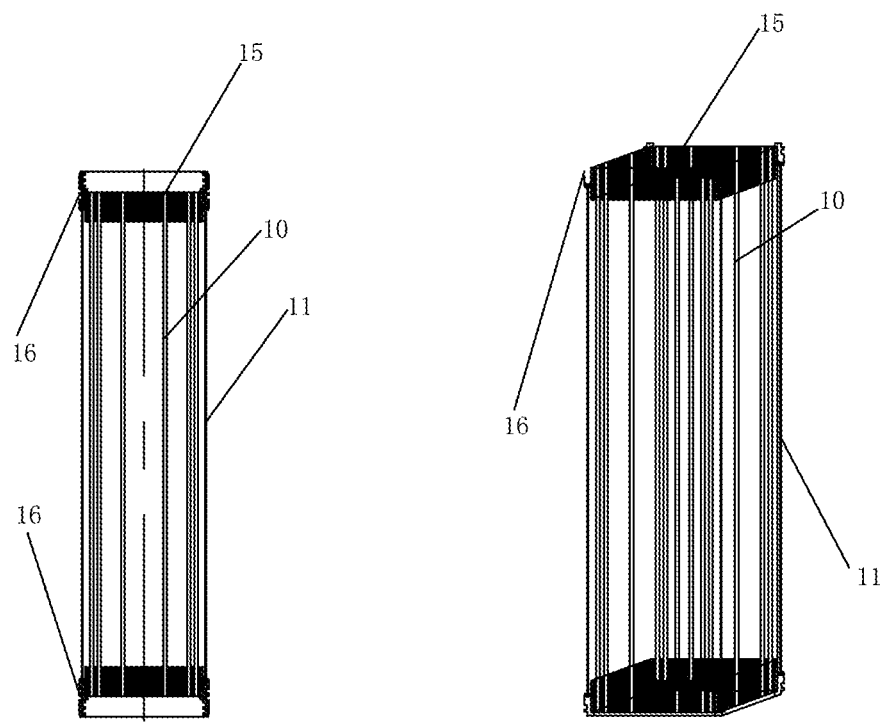
FIG. 6 is an axial sectional view of the membrane module of this vertical pressurized immersion membrane filtration system according to the present invention.
FIG. 7 is a schematic view of another embodiment of the rectangular membrane module of this vertical pressurized immersion membrane filtration system according to the present invention.
Figure 8:
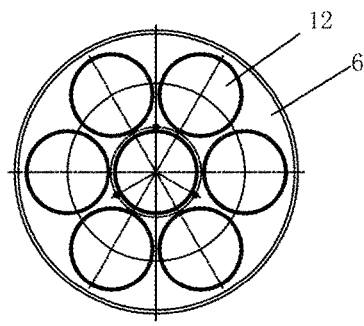
FIG. 8 is a cross-section diagram of the upper end plate of this vertical pressurized immersion membrane filtration system according to the present invention.
Figure 9:
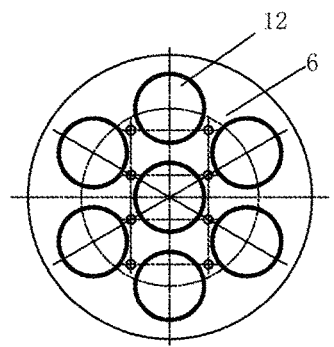
FIG. 9 is a cross-section diagram of the lower end plate of this vertical pressurized immersion membrane filtration system according to the present invention.
Figure 10:
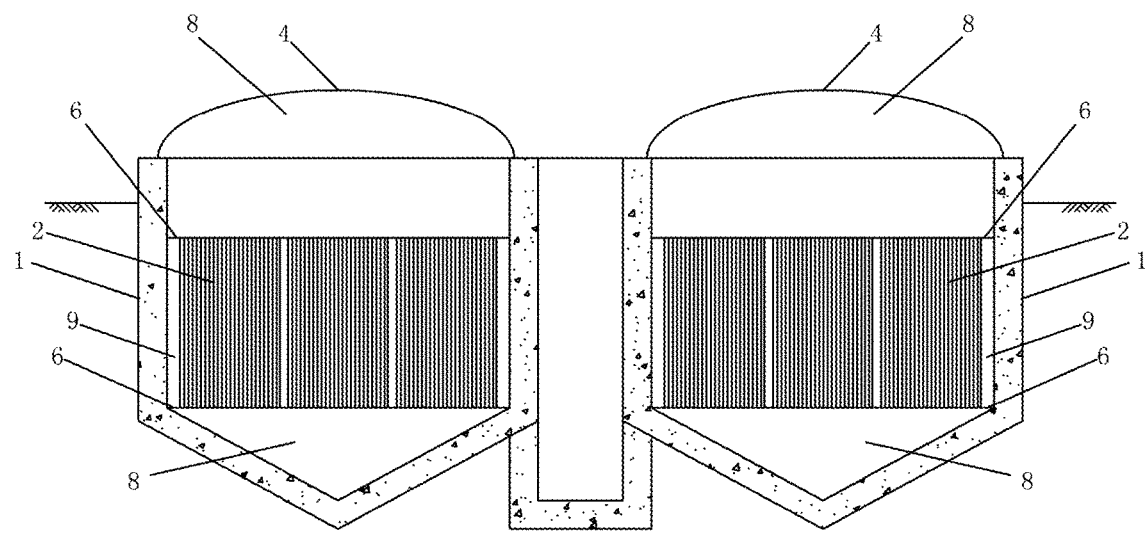
FIG. 10 is a schematic view of membrane train with two pressure vessel/tanks of this vertical pressurized immersion membrane filtration system according to the present invention.
Figure 11:
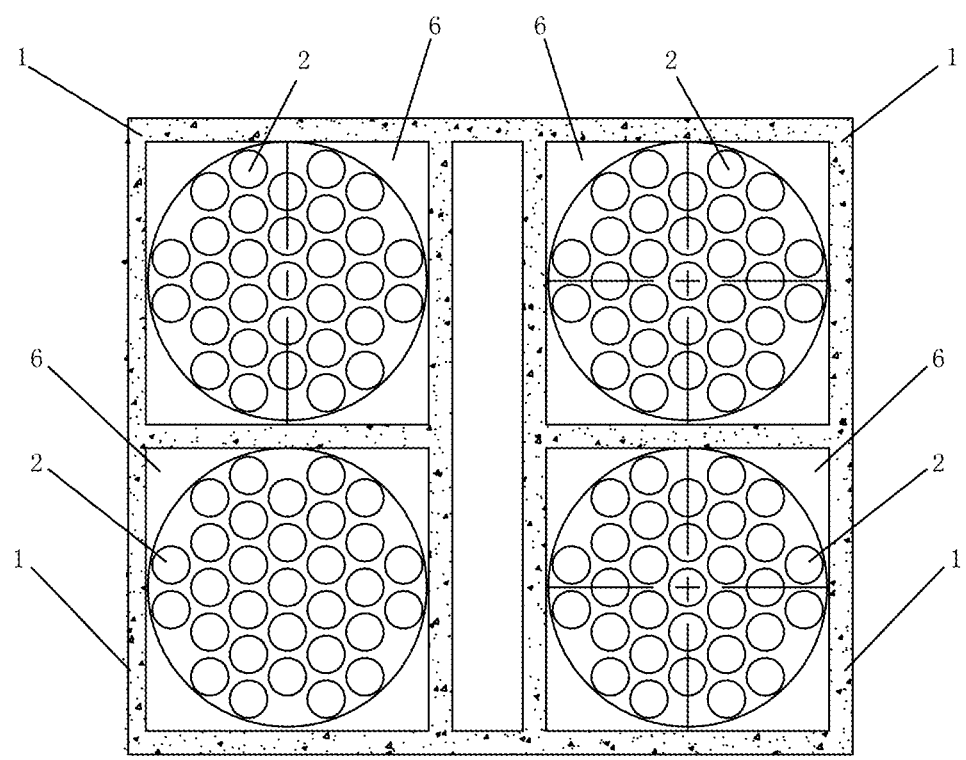
FIG. 11 is a schematic view of membrane train with four pressure vessel/tanks of this vertical pressurized immersion membrane filtration system.

Referring to the FIG. 1 to FIG. 11, the vertical pressurized immersion membrane filtration system of the present invention, includes at least one vertically-set pressure vessel/tank 1 with its ends being sealed, and at least one layer of membrane module, being sealed provided in said pressure vessel/tank 1, at least two vertically—set membrane modules 2 are provided in every layer of membrane module, the membrane modules 2 in every layer of membrane modules are in parallel with each other, there is a clearance 3 between said membrane module and said pressure vessel/tank 1, the uppermost and lowest ends of said every line of membrane module are provided with end plates 6, said two end plates 6 separate the space in the pressure vessel/tank 2 into two sealed end compartments 8 and a middle compartment 9, the two end compartments 8 are thus at the upper and lower ends of the pressure vessel/tank 1, and the middle compartment 9 is between said two end compartments 8. Said membrane module 2 includes interior membrane fibers 10 and an outer perforated supporting cylinder which surrounds the exterior of the membrane fibers 10, the water passes in or out of said outer perforated supporting cylinder, said pressure vessel/tank 1 is provided with an end water inlet/outlet 13 respectively at the outside of both two end compartments 8, said pressure vessel/tank 1 is also provided with a middle water inlet/outlet 14 at the outside of the middle compartment 9, the pressure vessel/tanks 1 are provided in parallel with each other. The further preferred technical proposal is that the upper and lower membrane modules 2 in said two layers of membrane modules are hermetically connected by a connector 7, i.e. add one layer of membrane module. It can improve the filtration efficiency. The details of the operation modes of the vertical pressurized immersion membrane filtration system are as follows:

A. Dead-end, inside-out filtration: as shown in FIG. 1, in the stage of filtration, raw water enters into the two end compartments 8 via the two end water inlet/outlets 13 located at the outside of the two end compartments 8. Under pressure, the water enters into the lumens of the membrane modules 2 via the end holes of the membrane fibers 10 of the membrane modules 2 which is connected with the end compartments 8, then under pressure, the water filtrates through membrane matrix and passes out of the outer perforated supporting cylinder of the membrane modules 2. And most of the filtrated water is collected between the pressure vessel/tank 1 and the membrane fibers 10, the rest flows through the membrane modules 2 and be filtrated via membrane fibers 10 on the membrane modules 2 which is located at the edge. And after filtration by the membrane fibers 10 in the membrane modules 2, the water flows out of the outer perforated supporting cylinder and enters into the middle compartment 9, and then the filtrated water is discharged from the middle water inlet outlet 14 under pressure. In the stage of cleaning, the clean water enters into the middle compartment 9 from the middle water inlet outlet, then it enters into the interior of the membrane modules 2 in opposite direction under pressure, namely it enters into the interior of the membrane fibers 10 and cleans up the pollutions on the inner surface of the membrane fibers 10, and then the backwash water and the pollutions are discharged into the end compartments 8 from the ends of the membrane fibers 10 and the membrane modules 2, then they are discharged out of the pressure vessel/tank 1 under pressure. The membrane modules 2 and the pressure vessel/tank 1 are thus cleaned up so that the system can go on with the next filtration procedure. As shown in FIG. 4, two layers of the membrane modules are provided in the pressure vessel/tank 1, the upper and lower membrane modules 2 of the two layers of the membrane modules are hermetically connected by the connectors 7 to ensure that the water can be directly carried and filtrated in the membrane modules 2 and avoiding blending with the water in the middle compartment. In the embodiment shown in FIG. 4, when it is filtrated, the water coming from the two ends of the pressure vessel/tank 1 and entering into one membrane module thus enters another membrane module 2 by going through the connector to be filtrated, which further improves the filtration efficiency.

Figure 2:
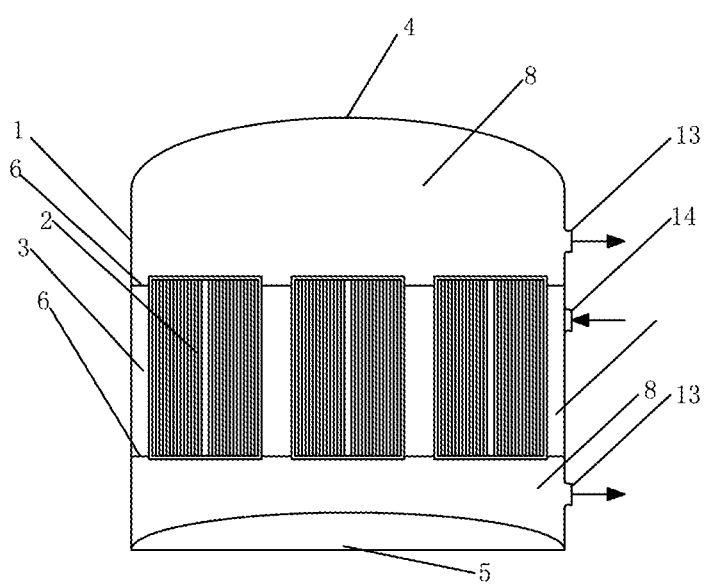
FIG. 2 is a schematic view of another embodiment 2 of the vertical pressurized immersion membrane filtration system according to the present invention.

B. Dead-end, outside-in filtration: as shown in FIG. 2, the raw water enters into the middle compartment 9 of the pressure vessel/tank 1 from the middle water inlet outlet 14, then it infiltrates into the membrane fibers 10 of the membrane modules 2 to be filtrated, then is discharged into the end compartments 8 through the membrane modules 2 which are connected with the end compartments 8, and then the filtrated water is discharged via the end water inlets/outlets 13 under pressure. In the stage of cleaning, the cleaning water enters into the end compartments 8 of the pressure vessel/tank 1 from the end water inlet outlets 13, then it flows from the ends of the membrane modules 2 into the membrane fibers 10 of the membrane modules 2 to clean the surface of the membrane fibers 10, and the polluted water and the pollutions are discharged from the middle water inlet outlet 14, the membrane modules 2 and the pressure vessel/tank 1 are thus cleaned up.

Figure 3:
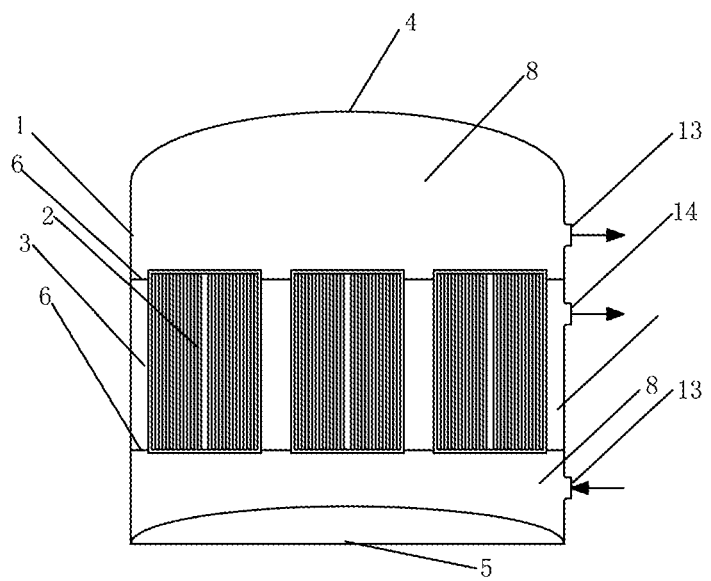
FIG. 3 is a schematic view of another embodiment 3 of this vertical pressurized immersion membrane filtration system according to the present invention.

C. Cross-flow, inside-out filtration: as shown in FIG. 3, in the stage of filtration, the raw water enters into the lower end compartment 8 in the pressure vessel/tank 1 from the lower end water inlet outlet 13. Part of the raw water enters into the membrane fibers 10 to be filtrated via the membrane modules 2 which are connected with the lower end compartment 8, and some of the raw water goes through the membrane modules 2 and directly enters into the next membrane modules 2 to go on with filtration, the rest of the raw water enters into the membrane module 2 and is discharged into the upper end compartment 8 and then is discharged via the upper end water inlet outlet 13 (i.e. concentrate outlet), and then after being filtrated by the membrane fibers 10 in the membrane modules 2, the filtrated water flows out of the outer perforated supporting cylinder and enters into the middle compartment 9, and is discharged from the middle water inlet outlet 14 under pressure. In the stage of cleaning, it goes on cleaning in the opposite direction, namely the cleaning water enters into the middle compartment 9 of the pressure vessel/tank 1 from the middle water inlet/outlet 14 to clean the surface of the membrane modules 2 and infiltrate into the membrane fibers 10, and under pressure, it passes out of the ends of the membrane fibers 10 or it infiltrates into the delivery pipe to clean the pollutions on the surface of the membrane fibers 10 and is discharged from the ends of the membrane modules 2 into the end compartments 8, and is discharged from the end water inlet outlets 13 under pressure to achieve the purpose of further cleaning the membrane modules 2 and the filtration system.

Therefore, Compared with the existing technology, the vertical pressurized immersion membrane filtration system with the above described structures has the following advantages: the outer perforated supporting cylinder surrounding the outside of the membrane fibers 10 of the membrane module 2 allow water pass-through, i.e. not only the water can enters into the membrane fibers 10 from the two ends of the membrane modules 2 to be filtrated and then discharged from the outside of the membrane modules 2, but also the water can be filtrated from the outside of the membrane modules 2 and carried to the two ends of the membrane modules 2 and then discharged out, namely both the internal pressure membranes and the external pressure membranes can be uses here in the present invention, which improves the applicability of the membrane filtration system. Moreover, because one layer or two layers of membrane modules can be loaded and each layer of membrane module can be composed of at least two membrane modules 2, therefore, multiple membrane modules 2 can be provided in the pressure vessel/tank 1, the multiple membrane modules 2 filtrate simultaneously the water, which extremely improves the filtration efficiency. Further more, every membrane module is sealed provided on the end plates 6, it is not necessary to replace all of the membrane modules 2, but just replace the damaged membrane 2, which is convenient for repairing and it can prolong the operation life of the whole membrane filtration system. At the same time, for the simple structure of the membrane modules 2 and the end plates 6, the production is more easily, the factory cost of the whole upright pressure infiltration compound membrane filtration system can be extremely reduced. Further more, multiple pressure vessel/tanks 1 can be provided in parallel and they can simultaneously go on with filtration, which further improves the filtration efficiency. The upright pressure infiltration compound membrane filtration system can be operated in the manner of the pressure type, namely increases the pressure when water infiltrates in to cause the high pressured infiltrating water, besides can be operated in the manner of immersion type, namely the water flows into the pressure vessel/tank 1, and goes on with filtration by increasing the pressure by suction of the production pump. When the infiltrated water is activated sludge mixture liquid, the system can be operated in the manner of the MBR (namely membrane Bio-reactor).

The Second Embodiment

Referring to FIG. 1 to FIG. 11, the vertical pressurized immersion membrane filtration system of this present, on the basis of the first embodiment, also can be that the upper and lower ends of said pressure vessel/tank 1 respectively are provided with an upper cover 4 and a lower cover 5 which detachably seal said pressure vessel/tank 1. The advantage of providing the upper cover 4 and the lower cover 5 is sealing the pressure vessel/tank 1. And the upper cover 4 and the lower cover 5 can be opened during repairing, which is convenient for repairing and maintenance. Certainly, it can only be provided with the upper cover 4 and the bottom of the pressure vessel/tank is sealed. The pressure vessel/tank 1 can be a pool poured by concrete, also can be other sealed vessel/tank. The upper part of it just can be opened so that the membrane modules 2 and the end plates 6 can be fixed. In additionally, the multiple pressure vessel/tanks can be connected, for example, two vessel/tanks or four vessel/tanks or more vessel/tanks being connected so as to make up a large filtration system. And one layer of the membrane module includes at least two membrane modules 2, generally includes three, four to seven membrane modules 2, the large one can include thirty membrane modules. Moreover, said outer perforated supporting cylinder includes an outer surface supporting web or an outer surface supporting frame, as long as the water filtrated by the membrane fibers 10 just can be exuded and the membrane fibers 10 can be fixed.

The Third Embodiment

Referring to FIG. 1 to FIG. 11, the vertical pressurized immersion membrane filtration system of the present invention, on the basis of the first or the second embodiment, also can be that said membrane module 2 also includes a potting 15 located at the two ends of the membrane fibers 10 and an ending head 16 located outside of said potting 15. Said potting 15 are provided at the ends of the membrane fibers 10. Said ending heads 16 fix said potting 15, said membrane fibers 10 and said outer perforated supporting cylinder together, so that such kind of membrane modules 2 can achieve the situation in which both the internal pressure infiltrating and the external pressure infiltrating can be applied in, which improves the applicability of the membrane filtration system. Certainly, the membrane modules 2 can have any other structures, as long as the outer of the membrane modules 2 infiltrating water. The further preferred technical proposal is that said end plates 6 is provided with fixing holes 12 which have the shape being in conformity with the shape of said ending heads 16. The edge of the upper ending head 16 located at the upper ends of said membrane modules 2 is hermetically fixed in the fixing holes 12 of the upper end plate 16. The edge of the lower ending heads 16 located at the lower end of said membrane modules 2 is hermetically fixed in the fixing holes 12 of the lower end plate 6. In this way, the membrane modules 2 are sealed fixed in the middle compartment 9 so that the water in the end compartments 8 and the water in the middle compartment 9 aren't blended together to affect the filtration result. The further preferred technical proposal is that the size of the fixing holes 12 on the upper end plate 6 is bigger than the size of the fixing holes 12 on the lower end plate 6. The fixing holes on said upper end plate 6 are fixed with the outer wall of said upper ending head 16 on the upper end of said membrane modules 2. The fixing holes of said lower end plate 6 are fixed with the inner wall of the lower ending head 16 on the lower end of said membrane modules 2. The advantage of such is the arrangement is that the size of the lower fixing holes is smaller than the size of the lower ending heads of the membrane modules 2, which can effectively support the membrane module without providing an extra fixing device. In additionally, the shape of said potting 15 and said ending heads 16, said outer perforated supporting cylinder and said fixing holes 12 are in conformity. In this way, it ensures that the end plates 6 hermetically fix the edge of the membrane modules 2 inside the middle compartment 9. The further preferred technical proposal is that the shape of said potting 15, said end heads 16, the said outer perforated supporting cylinder and the fixing holes 12 all being square or round. In this way, the manufacturing process is simple and the cost is low.

Referring to FIG. 1 to FIG. 11, the vertical pressurized immersion membrane filtration system of the present invention, on the basis of the first or second or third or forth embodiment, also can be that said outer perforated supporting cylinder 11 includes an outer surface supporting web or an outer surface supporting frame. In which, if the outer contour shape of the membrane modules 2 is round, then the outer perforated supporting cylinder 11 is a supporting web surrounding the outer of the membrane modules 2. And if the outer contour shape of the membrane modules 2 is square, then the outer perforated supporting cylinder 11 is a supporting frame which is located at the four edges for fixing and supporting. Certainly, the outer perforated supporting cylinder 11 can be any other types, as long as it can support and fix the membrane modules 2. In additionally, said pressure vessel/tank 1 is made of the metallic material or concrete material. The advantage of the pressure vessel/tank 1 being made of the metallic material is the convenient for fixing and good sealing ability, the advantage of the pressure vessel/tank 1 being made of concrete material is the low cost and the little corroding effects by the rain and air. In additionally, said pressure vessel/tank 1 can be built on the ground or the lower half part of said pressure vessel/tank 1 located under the ground, thus the half part of the pressure vessel/tank 1 buried under the ground can reduce the lifting capability of the system and extremely save the energy consumption.

The Forth Embodiment

Referring to FIG. 1 to FIG. 11, the vertical pressurized immersion membrane filtration system of the present invention, on the basis of the first or second or third embodiment, also can be that said two end water inlet outlets are respectively provided at the same side of said pressure vessel/tank 1. In this way, the advantage is that the configuration of the pipeline is convenient, the pipeline is simply and the cost can be reduced. The further preferred technical proposal is that said two end water inlet outlets and said middle water inlet outlet 14 are all provided at the same side of said pressure vessel/tank 1 respectively. In this way, the advantage is that the configuration of the pipeline is convenient, the pipeline is simply and the cost can be reduced. The most preferred technical proposal is that said pressure vessel/tank 1 is built on the ground or the lower half part of said pressure vessel/tank 1 is located under the ground.

The above stated is only a few embodiments of the present invention, and does not limit the protect field of the present invention. Any equal changes and modifications made according to the technical spirit of the present invention belong to the scope of the technical solution of the present invention.

The invention claimed is:
1. A vertical pressurized immersion membrane filtration system, comprising:
  at least one vertically-set pressure vessel/tank with sealed ends;
  a membrane module having a plurality of vertically stacked layers where at least one layer is sealed in said pressure vessel/tank and every layer of said membrane module is provided with at least two membrane modules parallel to each other, said membrane module comprising:
    interior membrane fibers;

an outer perforated supporting cylinder surrounding an exterior of the membrane fibers, wherein water filtrates out or infiltrates in from said outer perforated supporting cylinder; and
a potting located at two ends of the membrane fibers;
a clearance between said membrane module and said pressure vessel/tank; and
end plates respectively disposed at an uppermost end and a lowermost end of every layer of the membrane module, said two end plates separating a space in the pressure vessel/tank into two sealed end compartments, which are respectively sealed, and a middle compartment, the two sealed end compartments being provided at an upper end and a lower end of the pressure vessel/tank, and the middle compartment being provided between said two sealed end compartments,
wherein said pressure vessel/tank is provided with end water inlet/outlets respectively at an outside of both of said two sealed end compartments and a middle water inlet/outlet at an outside of said middle compartment, the end water inlet/outlets and middle water inlet/outlet being open to an exterior of the at least one vertically-set pressure vessel/tank,
wherein said middle water inlet/outlet is provided at a highest point position of said middle compartment,
wherein two layers of membrane modules are sealed in said pressure vessel/tank, and vertically adjacent membrane modules are hermetically connected by connectors at ends of the membrane modules.

2. The vertical pressurized immersion membrane filtration system according to claim 1, wherein the upper end and the lower end ends of the pressure vessel/tank are respectively detachably provided with an upper cover and a lower cover for sealing said pressure vessel/tank.

3. The vertical pressurized immersion membrane filtration system according to claim 1, wherein said membrane module further comprises:
ending heads located at the outside of said potting, said ending heads fixing said potting, said membrane fibers and said outer perforated supporting cylinder together.

4. The vertical pressurized immersion membrane filtration system according to claim 3, wherein said end plates are provided with fixing holes having a shape matching a shape of said ending heads,
wherein an edge of an upper ending head located at the uppermost end of said membrane module is hermetically fixed in the fixing holes of the end plate at the uppermost end of said membrane module, and
wherein an edge of a lower ending head located at the lowermost end of said membrane module is hermetically fixed in the fixing holes of the end plate at the lowermost end of said membrane module.

5. The vertical pressurized immersion membrane filtration system according to claim 4, wherein the fixing holes on the end plate at the uppermost end of said membrane module are larger than the fixing holes on end plate at the lowermost end of said membrane module,
wherein the fixing holes of the end plate at the uppermost end of said membrane module are fixed with an outer wall of the upper ending head on the uppermost end of said membrane module and the fixing holes of end plate at the lowermost end of said membrane module are fixed with an inner wall of the lower ending head on the lowermost end of said membrane module.

6. The vertical pressurized immersion membrane system according to claim 5, wherein a shape of said potting, said ending heads, said outer perforated supporting cylinders and said fixing holes are in conformity.

7. The vertical pressurized immersion membrane filtration system according to claim 6, wherein the shape of said potting, said ending heads or said outer perforated supporting cylinder is all square or round.

8. The vertical pressurized immersion membrane filtration system according to claim 1, wherein said outer perforated supporting cylinder includes an outer surface supporting web or an outer surface supporting frame.

9. The vertical pressurized immersion membrane filtration system according to claim 1, wherein said pressure vessel/tank is made of a metallic material or a concrete material.

10. The vertical pressurized immersion membrane filtration system according to claim 1, wherein said pressure vessel/tank is built on a ground or the lower half part of said pressure vessel/tank is located under the ground.

11. The vertical pressurized immersion membrane filtration system according to claim 1, wherein said end water inlet/outlets are respectively provided at a same side of said pressure vessel/tank.

12. The vertical pressurized immersion membrane filtration system according to claim 11, wherein said end water inlet/outlets and said middle water inlet/outlet are respectively provided at the same side of said pressure vessel/tank.

* * * * *